(12) United States Patent
St.Ives

(10) Patent No.: US 11,320,125 B2
(45) Date of Patent: May 3, 2022

(54) CABLE AND GRIPPER ASSEMBLY FOR SUSPENDED LIGHTING FIXTURES

(71) Applicant: Laurence Robert St.Ives, Las Vegas, NV (US)

(72) Inventor: Laurence Robert St.Ives, Las Vegas, NV (US)

( * ) Notice: Subject to any disclaimer, the term of this patent is extended or adjusted under 35 U.S.C. 154(b) by 0 days.

(21) Appl. No.: 17/024,400

(22) Filed: Sep. 17, 2020

(65) Prior Publication Data

US 2022/0082236 A1    Mar. 17, 2022

(51) Int. Cl.
*F21V 21/40* (2006.01)
*F21V 21/008* (2006.01)
*F21V 21/03* (2006.01)

(52) U.S. Cl.
CPC ............ *F21V 21/40* (2013.01); *F21V 21/008* (2013.01); *F21V 21/03* (2013.01)

(58) Field of Classification Search
CPC ..................................................... F21V 21/008
See application file for complete search history.

(56) References Cited

U.S. PATENT DOCUMENTS 10,247,277 B1 * 4/2019 Herrick ................... E21B 19/12
10,533,632 B1 * 1/2020 Herrick ................. F16G 11/048

\* cited by examiner

*Primary Examiner* — Joseph L Williams
(74) *Attorney, Agent, or Firm* — David B Abel

(57) ABSTRACT

A combination of a gripper assembly that reduces the risk of electrical short circuits by incorporating non-conductive components, and a specially designed small diameter two, three or four conductor high strength flexible cord, which incorporates high tensile non-metallic strands or cables under a resilient but flexible plastic outer cover.

14 Claims, 6 Drawing Sheets

CABLE AND GRIPPER ASSEMBLY FOR SUSPENDED LIGHTING FIXTURES

BACKGROUND OF THE INVENTION

Lighting manufacturers normally design suspended lighting fixtures from ceilings or overhead locations using high strength cable wire, such as stainless-steel aircraft wire, which passed through and may be secured by a gripper component secured to the light fixture. The gripper component allows the length of the cable wire to be adjusted in height at the push of a pillar, lever or a button. In these assemblies, it is generally necessary to have at least one separate power cord to feed low voltage or line voltage power to the lighting fixture. The power cord is usually an insulated two or three wire cord having a much larger diameter than the suspension cable wire. Architects, lighting designers and lighting manufacturers would all like to eliminate the dual cable wire and power cord to achieve a more refined appearance. It would therefore be beneficial to use the suspension cable wire and gripper components to provide power and support the lighting fixture safely. Various designs have been conceived which incorporate copper wire into the steel aircraft cable to provide a single conductor. Such products are expensive to manufacture due to their many parts required to insulate the system, and complicated to install, as two conductors are required to power a fixture which requires two complete assemblies, further increasing the product cost and installation cost. As color changing lights require three or four conductors, such systems which provide only single conductors do not satisfy the market.

Alternate systems have been conceived which use a plastic insulation covered power cord with a single conductor and a metal braided inner jacket. These systems have proven susceptible to stretching and breaking or being sheared by the adjustable gripper components under low loads. Also, gripper components are made from conductive metals with metal ball bearings to grip the cable wire which can result in electrical short circuits if the bearings penetrate the plastic insulation cover. They are also difficult to connect to incoming power and the fixtures and are less flexible than desired, and they are not usually approved under building and facility regulations for electrical lighting systems.

SUMMARY OF THE INVENTION

The present invention comprises a combination of a gripper assembly that reduces the risk of electrical short circuits by incorporating non-conductive components and cable wire securing elements, and a specially designed small diameter two, three or four conductor high strength flexible cord, which incorporates high tensile non-metallic strands or cables under a resilient but flexible plastic outer cover. The invention achieves the desirable requirement of eliminating a separate power cord and providing electrical conductors through a single high strength flexible cord, which pass through a length adjusting gripper assembly. The high strength flexible cord can be stripped and connected by electricians in the normal manner used in the industry, without special tools or secondary components.

DETAILED DESCRIPTION OF THE INVENTION

Figure 1:
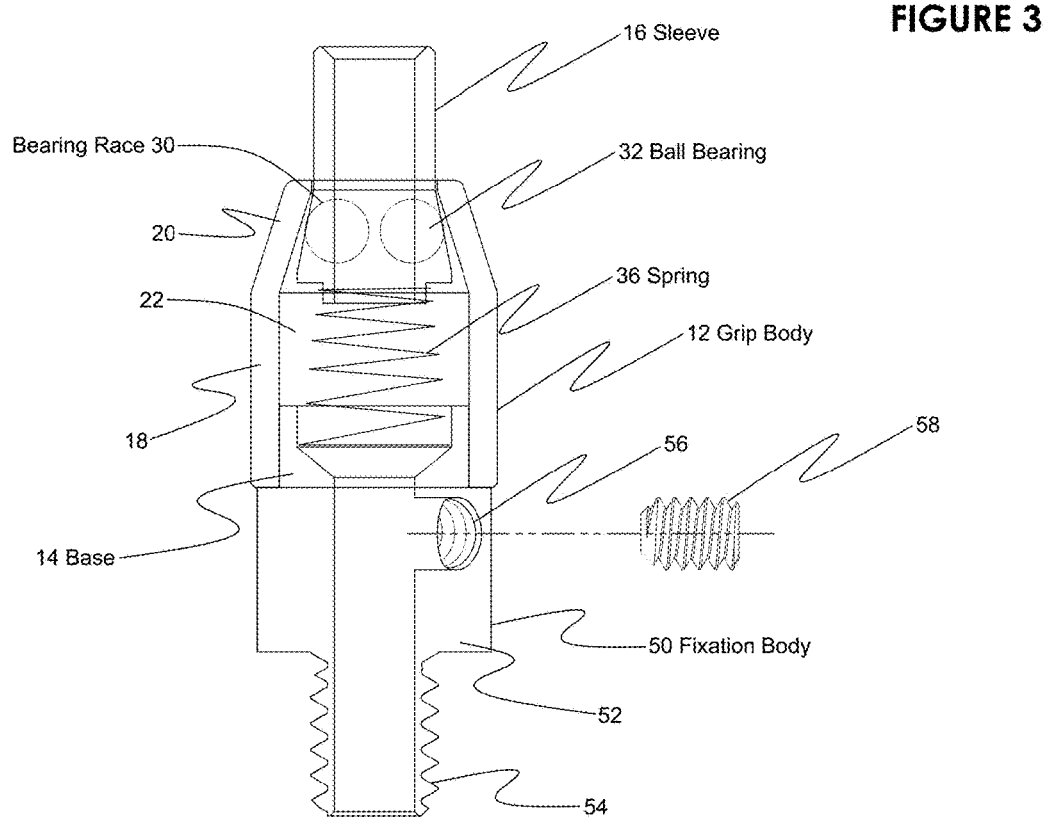
FIG. 1 is a partial axial cross-sectional view of a gripper assembly.

FIG. 1 is a partial cross-sectional view of a gripper assembly 10 apparatus for suspending an electric powered device such as a lighting fixture, and preferably a LED lighting fixture. The gripper assembly 10 may include a grip body 12, a base 14 that may be affixed inside of the grip body 12 by a threaded or press fit connection, and a sleeve 16. The grip body 12 has a generally cylindrical hollow lower section 18 and a partial cone shaped hollow upper section 20. The base 14, lower section 18 and upper section 20 combine to define a chamber 22. The sleeve 16 preferably includes a cylindrical top section 24 and a flared bottom section 26. The cylindrical top section 24 has a diameter slightly less than the diameter of the top open end of the upper section 20 of the grip body 12. The flared bottom section 26 of the sleeve 16 includes three to five bearing races 30, openings through the flared bottom section 26 of the sleeve 16, that contain ball bearings 32. The ball bearings 32 are preferably formed from ceramic or a high strength non-conductive plastic or polymer material. The chamber 22 encloses a resilient element such as for example a spring 36 that sits on the base 14, with an upper end exerting an upward force on the sleeve 16. The ball bearings 32 are constrained within the bearing races 30, the inside flared diameter wall of the upper section 20, and the other ball bearings. By this configuration, a cable (not shown) inserted through an upper end of the sleeve 16 presses out against the ball bearings 32, forcing the sleeve 16 downward against the bias of the spring 36, thereby expanding the radial space between the ball bearings 32, until the cable can pass through the chamber 22 and extend out through the base 14. The cable can be easily pushed into and through the gripper assembly 10. Once the cable is positioned, it is secured as against being pulled out of the gripper assembly 10 by the interaction of the ball bearings 32 being squeezed between the cable and the cone shaped hollow upper section 20 of the grip body 12. However, the cable can be withdrawn from the gripper assembly 12 by manually depressing the sleeve 16 against the spring 36, thereby allowing the spacing of the ball bearings 32 to expand. Before the base 14 is secured to the grip body 12, the sleeve 16, ball bearings 32 and the spring 36 are placed within the chamber 22.

The gripper assembly 10 also includes a fixation body 50 secured to the grip body 12, for example by a threaded connection to either the base 14 or the lower section 18. The fixation body 50 includes a hollow cylindrical section 52 and a threaded extension 54. The threaded extension 54 allows the gripper assembly to be secured to a fixture such as a LED lighting assembly. The fixation body 50 preferably includes cable securing elements or components to secure against an inserted cable wire. In the configuration of FIG. 1, the components include an internally threaded radial orifice 56 and a correspondingly sized and threaded set screw 58.

Figure 2:
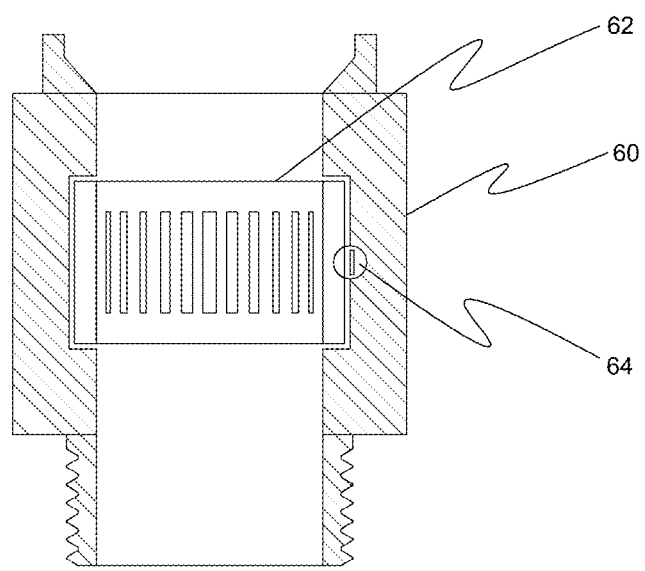
FIG. 2 is a cross-sectional view of alternative configuration for the fixation body of the gripper assembly depicted in FIG. 1.

An alternative configuration for the fixation body 60 is depicted in the cross-sectional view of FIG. 2, wherein the fixation body 60 encloses a hose clamp 62 and an adjusting screw 64. Alternatively, a split compression ring and screw may be inserted into the fixation body 60. In any of these configurations, the set screw 58, hose clamp 62 or alternative fixation element such as for example a split compression ring, may be compressed against the outside diameter of a cable wire inserted therethrough to secure the location of the gripper assembly 10 on the cable wire and prevent both slippage on and damage to the cable wire. In addition, the fixation body and the components secured against an inserted cable wire substantially increase the load bearing capacity.

Figure 3:
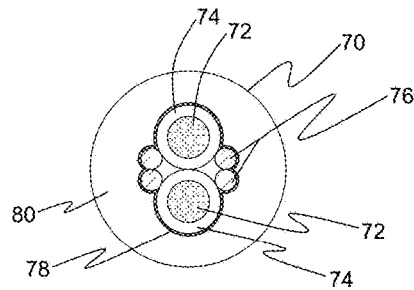
FIG. 3 is a cross-sectional view of a fiber reinforced high strength flexible cable wire for use with the gripper assembly of FIG. 1.

FIG. 3 is a cross-sectional view of a fiber reinforced high strength flexible cable wire 70 for use with the gripper assembly of FIG. 1. The cable wire 70 includes two to four multi-stranded conductors 72 having insulation covers 74. The cable wire 70 also includes at least one, and preferably four or more, high strength non-conductive fibers 76, formed from a para-aramide synthetic fiber such as Kevlar® or similar material such as Technora®. The conductors 72 are preferably enclosed with the high strength fibers 76 in a thin Modified Polyphenylene Ether (mPPE) jacket 78, and encased in a polyurethane casing 80.

Figure 4:
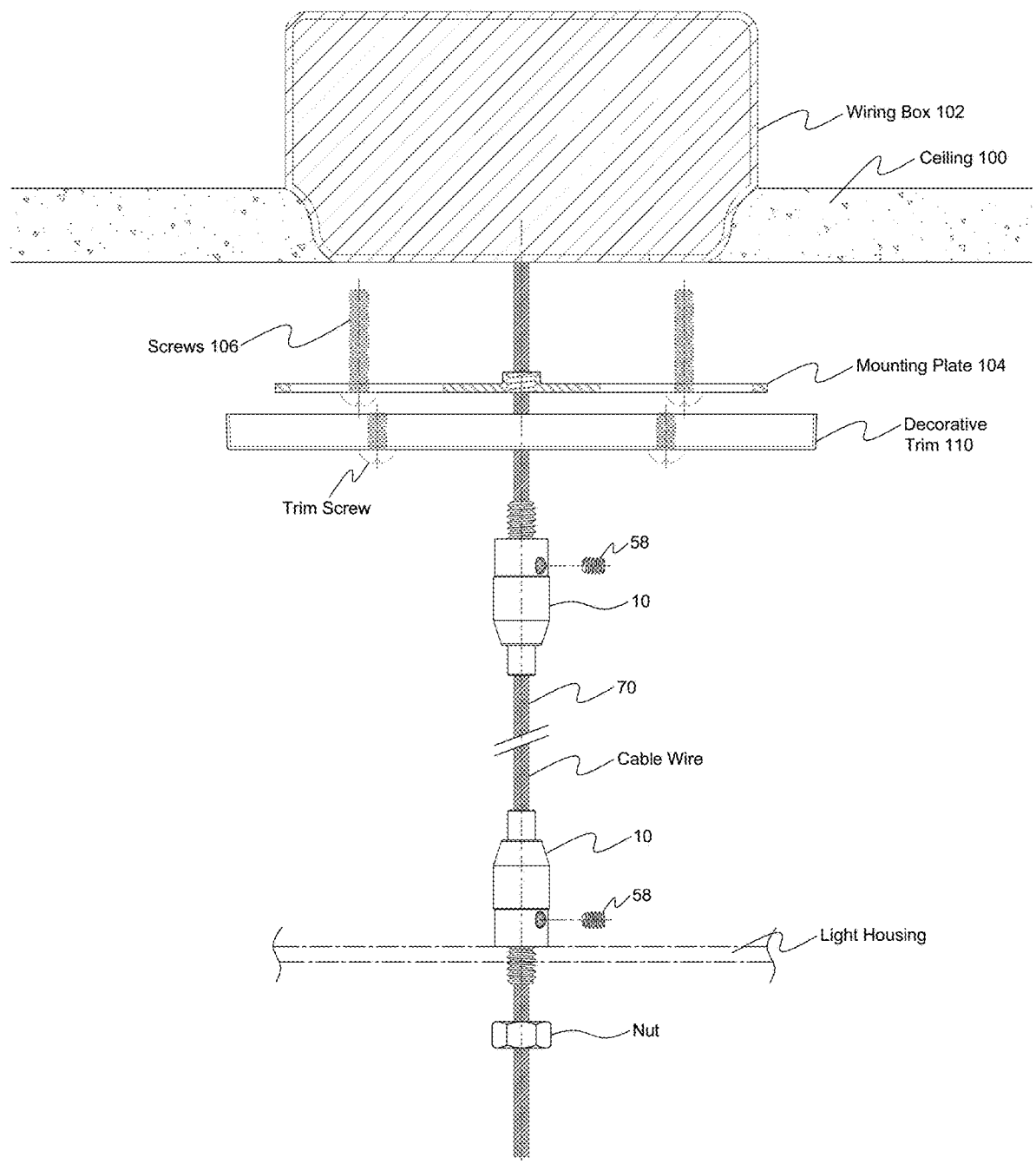
FIG. 4 is an exploded assembly diagram depicting a light fixture installation using the gripper assembly of FIG. 1 and cable wire of FIG. 3.

FIG. 4 is an exploded assembly diagram depicting the suspension of a light fixture installation from a ceiling mount using the cable wire 70 of FIG. 3 and a pair of the gripper assemblies 10 of FIG. 1. The ceiling 100 of any standard design configuration includes an electrical wiring box 102. The wiring box 102 comes in standard sizes to accommodate a mounting plate 104 secured with screws 106. The mounting plate 104 has an internally threaded orifice 108. The assembly may also include a decorative trim piece 110 that may be secured to the mounting plate 104.

Figure 5:
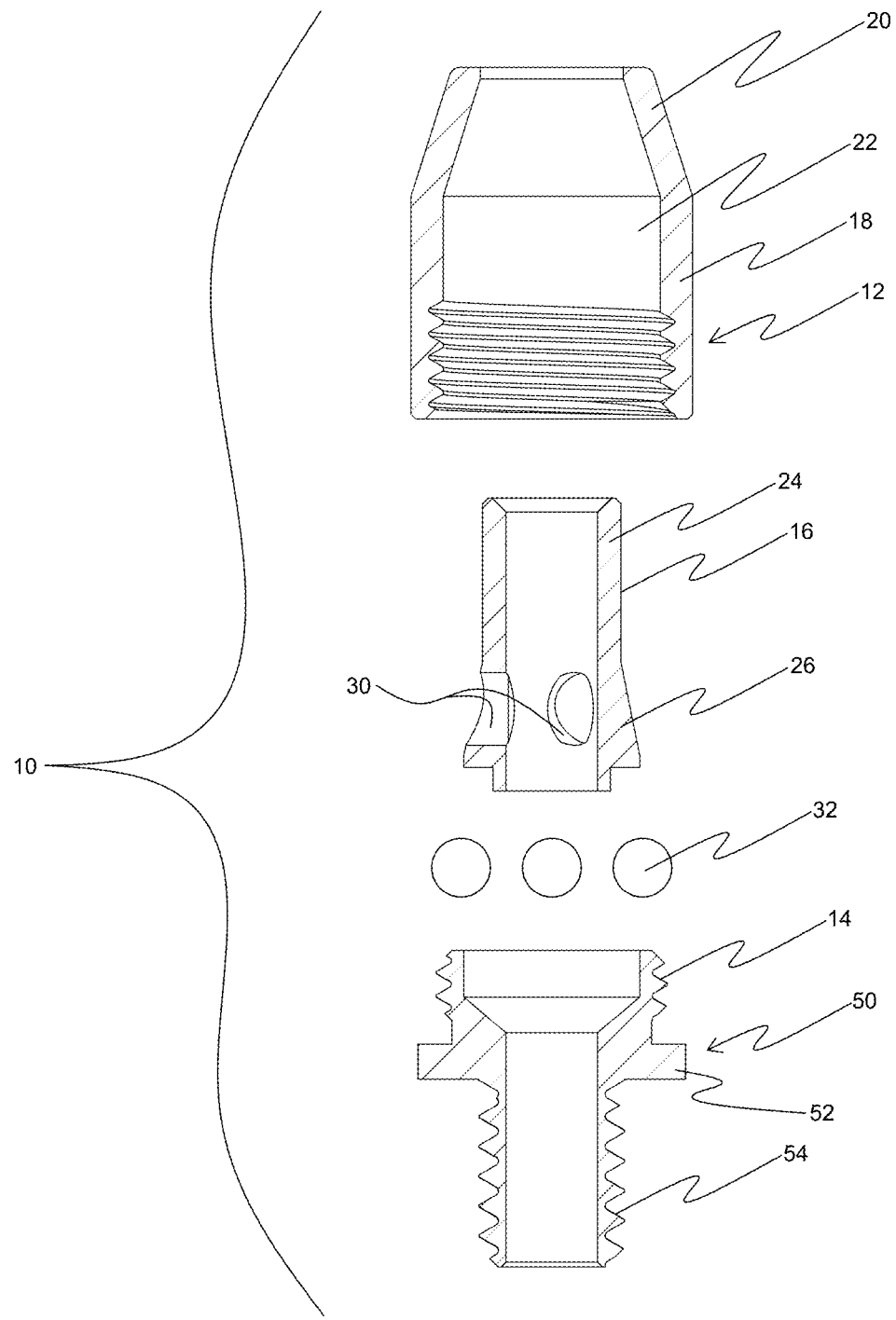
FIG. 5 is an exploded view of the main components of the gripper assembly.

FIG. 5 is an exploded view of the main components of the gripper assembly 10. At the top of the figure, the grip body 12 includes the hollow lower section 18 and a partial cone shaped hollow upper section 20 that define chamber 22. The lower portion of the hollow lower section is preferably internally threaded. The sleeve 16 includes a cylindrical top section 24 and a flared bottom section 26. The cylindrical top section 24 has a diameter slightly less than the diameter of the top open end of the upper section 20 of the grip body 12. The flared bottom section 26 of the sleeve 16 includes three to five bearing races 30, that contain ball bearings 32. The ball bearings 32 are formed from ceramic, brass or a high strength non-conductive plastic or polymer material. The ball bearings 32 are constrained within the bearing races 30, the inside flared diameter wall of the upper section 20, and the other ball bearings. At the bottom of the exploded view, the gripper assembly 10 also includes the fixation body 50, in this embodiment including the base 14 that threadably engages the lower section 18 of the grip body 12. The fixation body 50 includes a hollow cylindrical section 52 and a threaded extension 54.

Figure 6:
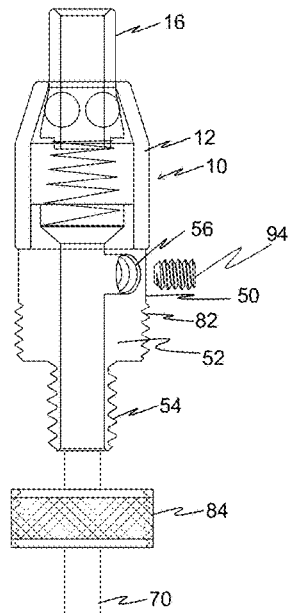
FIG. 6 is a partial axial cross-sectional view of an alternative gripper assembly.

FIG. 6 is a partial axial cross-sectional view of an alternative gripper assembly 10. As in FIG. 1, the grip body 12 includes the hollow lower section 18 and a partial cone shaped hollow upper section 20 that define chamber 22. The sleeve 16 includes the cylindrical top section and the flared bottom section. The flared bottom section of the sleeve 16 includes three to five bearing races 30, that contain ball bearings. The bottom of the gripper assembly 10 includes the fixation body 50, in this embodiment including the base 14 that threadably engages the lower section 18 of the grip body 12. The fixation body 50 includes a hollow cylindrical section 52 a portion 82 of which is externally threaded, and the threaded extension 54. The threaded portion 82 of the fixation body may accommodate an internally threaded opening in an electrical box or a lighting fixture (not shown). A nut 84 may alternatively attach to the threaded portion 82 or the threaded extension 54 to secure the gripper assembly 10 to an electrical box or a lighting fixture.

Figure 7:
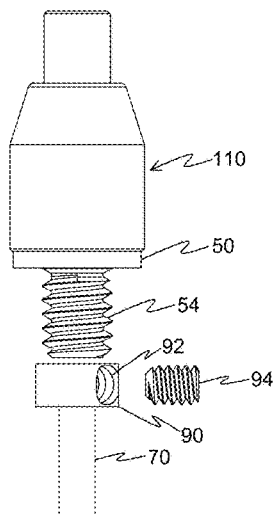
FIG. 7 is a side view of an alternative configuration of a gripper assembly.

FIG. 7 is a side view of an alternative configuration of a gripper assembly 110. The internal configuration of the gripper assembly 110 is equivalent to the configurations of FIGS. 1, 5 and 6 discussed above. In the embodiment of FIG. 7, as set screw body 90 may be placed below, or partial screwed onto, the threaded extension 54 of the fixation body 50. The set screw body 90 includes an internally threaded orifice 92 to receive a set screw 94, which when tightened onto the cable wire 70 prevents the cable wire 70 from being pulled back through the gripper assembly 110.

Figure 8:
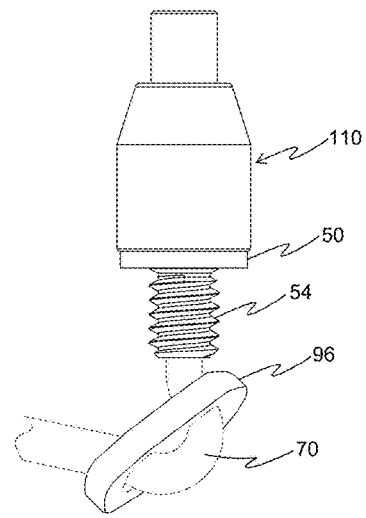
FIG. 8 is a side view of another alternative configuration of a gripper assembly.

FIG. 8 is a side view of another alternative configuration of a gripper assembly 110 similar to FIG. 7. In FIG. 8, the set screw body 90 of FIG. 7 is replaced with a looping grommet 96, having a pair of openings 98 through which the cable wire 70 is inserted. When the looping grommet 96 is slid along the cable wire 70 until it abuts the threaded extension 54 of the fixation body 50, the looping grommet 96 prevents the cable wire 70 from being pulled back through the gripper assembly 110.

Figure 9:
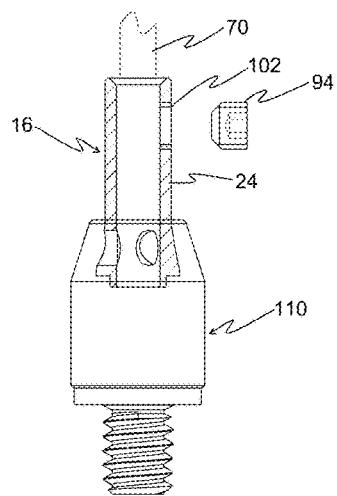
FIG. 9 is a side view of another alternative configuration of a gripper assembly.

FIG. 9 is a side view of another alternative configuration of a gripper assembly 110. The internal configuration of the gripper assembly 110 is equivalent to the configurations of FIGS. 1, 5 and 6 discussed above. In the embodiment of FIG. 9, the cylindrical top section 24 of the sleeve 16 includes an internally threaded orifice 102 to receive a set screw 94. As in the prior embodiments, tightening of the set screw against the cable wire 70 prevents slippage of the cable wire 70 through the gripper assembly 110.

Figure 10:
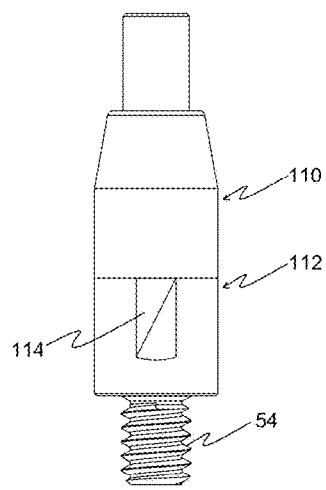
FIG. 10 is a side view of another alternative configuration of a gripper assembly.
Figure 11:
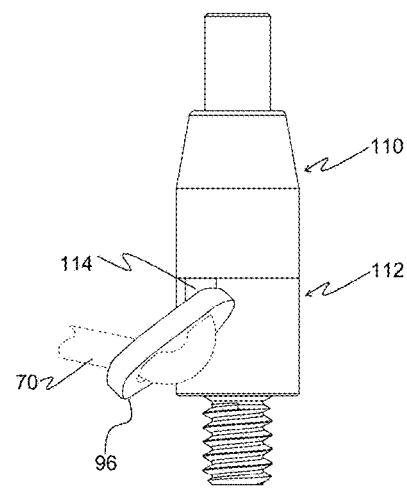
FIG. 11 is a side view of another alternative configuration of a gripper assembly.
Figure 12:
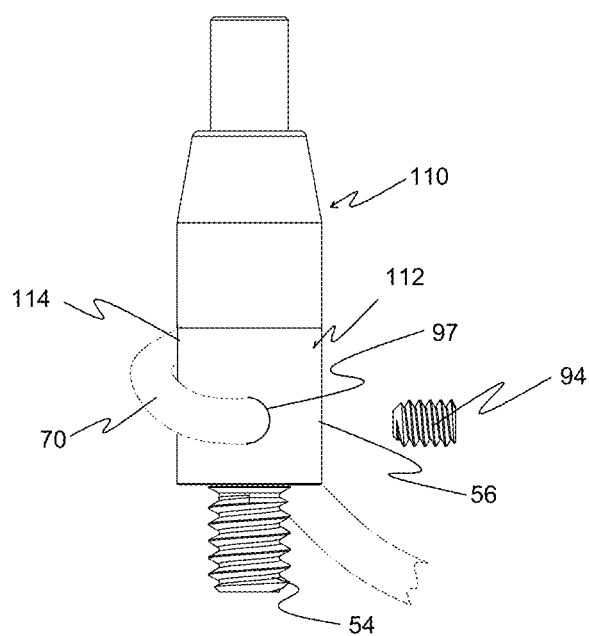
FIG. 12 is a side view of another alternative configuration of a gripper assembly.

FIG. 10 is a side view of another alternative configuration of a gripper assembly 110. The internal configuration of the gripper assembly 110 is equivalent to the configurations of FIGS. 1, 5 and 6 discussed above. In the embodiment of FIG. 10, the fixation body 112 includes a side exit chute 114, allowing the wire cable (not shown) to exit through the side of the fixation body 112. The fixation body includes the threaded extension 54, which in the embodiment of FIG. 10 is not hollow. FIG. 11 is a side view of another alternative configuration of a gripper assembly 110 similar to that of FIG. 10. As depicted in FIG. 11, the cable wire 70 passing through the side exit chute 114 passes through a looping grommet 96 as in FIG. 8. The looping grommet 96 prevents the cable wire 70 from being pulled through the gripper assembly 110. FIG. 12 is a side view of another alternative configuration of a gripper assembly 110 including a fixation body 112 having a side exit 114 as in FIG. 10 providing an exit of the cable wire 70, and a through hole 97 passing radially back through the lower portion of the fixation body 112. The cable wire 70 may be secured within the through hole 97 with a set screw 94 inserted into the fixation body 112 perpendicular to the through hole 97

To install the light fixture, the cable wire 70 is cut and the conductors 72 are stripped at one end and so that the conductors 72 may be connected to the power and control wires within the wiring box 102. The cable wire 70 is then fed through the orifice 108 of the mounting plate 104, and the mounting plate 104 is secured to the wiring box 102 with screws 106. The cable wire 70 is then fed through a gripper assembly 10 having a threaded extension that screws into and is secured within the orifice 108 of the mounting plate 104. The decorative trim 110 may then be installed onto the mounting plate 104. The set screw 58 of the gripper assembly 10 may also be tightened against the cable wire 70. The cable wire is then fed through a second gripper assembly 10 oppositely disposed to the gripper assembly 10 secured to the mounting plate 104. The light housing, shown in partial phantom view, is then installed on the second gripper assembly 10 for example with a nut 112. The height of the light housing may be adjusted to the desired level by feeding the cable wire through the second gripper assembly 10. Once the light housing is properly suspended, the set screw 58 of the gripper assembly 10 is secured against the cable wire 70. The end of the cable wire 70 extending into the light housing can then be trimmed, the conductors 72 stripped and fastened to the electrical elements of the light housing.

In standard configurations, a linear lighting fixture usually employ two adjustable gripper assembly suspension points and thus a cable wire 70 having a pair of conductors 72 as shown in FIG. 3 may be installed at each suspension point providing four electrical conductors for color changing or dimmable lighting. The novel securing method within the gripper assembly 10 using the non-conductive ceramic ball bearings to grip the cable wire 70, pinching the non-conductive fibers 76 cables within the jacket 78, thereby increasing the load bearing capacity of the cable wire 70, and enabling height adjustment or leveling in the usual manner of the cable gripper assembly 10. To further increase the load bearing capacity of the suspension cord the gripper assembly 10 has the set screw 58, or hose clamp 62 or equivalent fixation elements, which secures the cable wire 70 within and to the gripper assembly 10 against a bearing surface which increases the weight bearing capacity of the cable wire 70 by providing greater load bearing support than the adjustable bearing mechanism alone. For example, as compared to a standard cable having weight bearing capacity of up to 50 pounds, the combination of the gripper assembly 10 and the cable wire 70 described herein has a weight bearing capacity of at least 60 pounds and up to 85 to 90 pounds. Accordingly, the combined components allow the suspension of lighting fixtures weighing up to 90 pounds from a single cable wire 70, or up to 180 pounds with a pair of cable wires 70 at each end. Also, the set screw 58, or hose clamp 62 or equivalent fixation elements, which secures the cable wire 70 within and to the gripper assembly 10 prevents the bearings from pinching the cable wire 70 with excessive forces which may fracture or weaken the external and internal cord jackets and cause stretching of the cable cover. Additional load bearing capacity up to another 140 pounds can be achieved with the use of the cable wire 70 described herein by adding a retaining clamp or securement element securing the high strength fibers 76 stripped from the jacket 78, securing the opposite ends of the high strength fibers of structural components in the wiring box 102 and lighting fixture, respectively.

Releasing the pressure of the set screw enables the gripper assembly 10 or 110 adjustment to be employed to release and secure the cable wire 70 with the spring compression mechanism for height adjustment. The invention also reduces the number of parts required to support and install an easily adjustable suspended lighting fixture and safely supports a greater weight than is possible with a standard power cord of comparable diameter.

The invention has been described in detail above in connection with the figures, however it should be understood that the apparatus described herein may include other components and enable other functions. Those skilled in the art will appreciate that the foregoing disclosure is meant to be exemplary and specification and the figures are provided to explain the present invention, without intending to limit the potential modes of carrying out the present invention. The scope of the invention is defined only by the appended claims and equivalents thereto.

The invention claimed is:

1. An apparatus for suspending an electric powered device, comprising:
    at least one gripper assembly including a grip body defining a chamber, a sleeve inserted through said chamber of said grip body, and a fixation body removeably securable to said grip body, said grip body and said sleeve constraining at least one ball bearing in a bearing race defined by said sleeve internally to said grip body, and a resilient element positioned between said sleeve and said fixation body within said chamber;
    cable securing elements; and
    a cable wire including two to four multi-stranded conductors enclosed within insulation covers and at least one high strength non-conductive fiber, said conductors and said high strength fiber encased in a thin jacket and a casing, said cable wire having a weight bearing capacity of 60 to 90 pounds.

2. The apparatus of claim 1, wherein the cable securing element is selected from the group consisting of:
    a threaded orifice in one of said grip body, sleeve and fixation elements and a set screw,
    a hose clamp and an adjusting screw within said fixation body,
    a split compression ring and screw inserted into said fixation body,
    a set screw body and set screw, and
    a looping grommet.

3. The apparatus of claim 1 including at least three ball bearings formed from a material selected from the group consisting of ceramic, brass and a high strength non-conductive plastic or polymer material.

4. The apparatus of claim 1 including at least three ball bearings formed from a ceramic material.

5. The apparatus of claim 1, wherein said high strength non-conductive fiber is formed from a para-aramide synthetic fiber.

6. The apparatus of claim 1, wherein said jacket enclosing said conductors and said high strength fibers is formed from a modified polyphenylene ether.

7. The apparatus of claim 1, wherein said fixation body further comprising a side exit chute.

8. The apparatus of claim 1, further comprises at least a pair of gripper assemblies and a pair of cable wires having a combined weight bearing capacity capable of supporting an electric powered device weighing 100 to 180 pounds.

9. The gripper assembly of claim 1, wherein said fixation body includes a side exit chute and a through hole.

10. A gripper assembly comprising:
a grip body defining a chamber;
a sleeve inserted through said chamber of said grip body;
a fixation body removeably securable to said grip body, said grip body and said sleeve constraining at least one ball bearing in a bearing race defined by said sleeve internally to said grip body and a resilient element positioned between said sleeve and said fixation body within said chamber; and
cable securing elements selected from the group consisting of:
- a threaded orifice in one of said grip body, sleeve and fixation elements and a set screw,
- a hose clamp and an adjusting screw within said fixation body,
- a split compression ring and screw inserted into said fixation body,
- a set screw body and set screw, and
- a looping grommet.

11. The gripper assembly of claim 10 including at least three ball bearings formed from a material selected from the group consisting of ceramic, brass and a high strength non-conductive plastic or polymer material.

12. The gripper assembly of claim 10, wherein said fixation body further comprising a side exit chute.

13. A cable wire comprising: two to four multi-stranded conductors enclosed within insulation covers and at least one high strength non-conductive fiber, said conductors and said high strength fiber encased in a thin jacket and a casing, said cable wire having a weight bearing capacity of 60 to 90 pounds.

14. The cable wire of claim 13, wherein said high strength non-conductive fiber is formed from a para-aramide synthetic fiber.

* * * * *